United States Patent
Halperin et al.

(10) Patent No.: US 11,554,543 B2
(45) Date of Patent: Jan. 17, 2023

(54) MULTI-SHELF THREE-DIMENSIONAL PRINTING

(71) Applicant: ASSEMBRIX LTD., Petach Tikva (IL)

(72) Inventors: Dan Halperin, Tel-Aviv (IL); Lior Polak, Tel-Aviv (IL)

(73) Assignee: ASSEMBRIX LTD., Petach Tikva (IL)

( * ) Notice: Subject to any disclaimer, the term of this patent is extended or adjusted under 35 U.S.C. 154(b) by 0 days.

(21) Appl. No.: 16/965,725

(22) PCT Filed: Feb. 6, 2019

(86) PCT No.: PCT/IL2019/050140
§ 371 (c)(1),
(2) Date: Jul. 29, 2020

(87) PCT Pub. No.: WO2019/155460
PCT Pub. Date: Aug. 15, 2019

(65) Prior Publication Data
US 2021/0114291 A1    Apr. 22, 2021

Related U.S. Application Data

(60) Provisional application No. 62/626,696, filed on Feb. 26, 2018.

(51) Int. Cl.
*B29C 64/176* (2017.01)
*B29C 64/153* (2017.01)
(Continued)

(52) U.S. Cl.
CPC .......... *B29C 64/171* (2017.08); *B29C 64/153* (2017.08); *B29C 64/176* (2017.08);
(Continued)

(58) Field of Classification Search
CPC ..... B29C 64/171; B29C 64/176; B29C 64/40; B22F 10/40
See application file for complete search history.

(56) References Cited

U.S. PATENT DOCUMENTS 6,422,801 B1    7/2002  Solomon
8,980,150 B2 *  3/2015  Oshima ................. B32B 5/16
                                        264/308
(Continued)

FOREIGN PATENT DOCUMENTS

DE    10 2015 200634        7/2016
DE    102015200634 A1 *     7/2016  ........... B29C 64/153
(Continued)

OTHER PUBLICATIONS

Supplementary European Search Report and Opinion for European Application No. 19751263 dated Sep. 9, 2021. (Year: 2021).*
(Continued)

*Primary Examiner* — Atul P. Khare
(74) *Attorney, Agent, or Firm* — Pearl Cohn Zedek Latzer Baratz LLP (57) ABSTRACT

A three-dimensional printing system includes a print bed and a shelf insertion mechanism for inserting a shelf of one or a plurality of auxiliary shelves into a print volume between the print bed and a printer head. A printer assembly is configured to deposit layers of material within the print volume to form one or more objects on a support platform, the support platform including the print bed or an auxiliary shelf that is inserted into the print volume by the shelf insertion mechanism. A controller is configured to control the shelf insertion mechanism to insert an auxiliary shelf between the print bed and a printer head of the system after formation of the objects on that support platform by the printer assembly is complete.

10 Claims, 3 Drawing Sheets

(51) Int. Cl.
  *B29C 64/171* (2017.01)
  *B29C 64/232* (2017.01)
  *B29C 64/245* (2017.01)
  *B29C 64/386* (2017.01)
  *B29C 64/209* (2017.01)
  *B29C 64/236* (2017.01)
  *B29C 64/40* (2017.01)
  *B33Y 10/00* (2015.01)
  *B33Y 30/00* (2015.01)
  *B33Y 50/02* (2015.01)

(52) U.S. Cl.
  CPC .......... *B29C 64/209* (2017.08); *B29C 64/232* (2017.08); *B29C 64/236* (2017.08); *B29C 64/245* (2017.08); *B29C 64/386* (2017.08); *B29C 64/40* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 9,067,360 | B2* | 6/2015 | Wehning | A61C 13/0013 |
| 9,475,234 | B2* | 10/2016 | Morikawa | B29C 64/176 |
| 10,016,930 | B2* | 7/2018 | Sun | B29C 64/106 |
| 10,124,540 | B2* | 11/2018 | Ooba | B22F 10/10 |
| 10,406,751 | B2* | 9/2019 | Fulop | B08B 3/12 |
| 10,500,789 | B2* | 12/2019 | Fulop | B22F 10/68 |
| 10,518,469 | B2* | 12/2019 | Goel | B33Y 50/02 |
| 2009/0152798 | A1 | 6/2009 | Dangelewicz | |
| 2016/0368224 | A1* | 12/2016 | Ooba | B29C 64/153 |
| 2018/0043630 | A1* | 2/2018 | Hoover | B29C 64/106 |
| 2018/0222115 | A1* | 8/2018 | Watanabe | G03G 15/224 |
| 2019/0381731 | A1* | 12/2019 | Walsh | B29C 64/176 |
| 2021/0362241 | A1* | 11/2021 | Long | B22F 10/85 |

FOREIGN PATENT DOCUMENTS

| | | | |
|---|---|---|---|
| EP | 3015251 | 5/2016 | |
| EP | 3015251 A1 * | 5/2016 | ........... B29C 64/165 |
| WO | WO 2017/209337 | 12/2017 | |
| WO | WO-2017209337 A1 * | 12/2017 | ............. B33Y 40/00 |

OTHER PUBLICATIONS

International Search Report for PCT Application No. PCT/IL2019/050140 dated May 14, 2019.

* cited by examiner

MULTI-SHELF THREE-DIMENSIONAL PRINTING

CROSS-REFERENCE TO RELATED APPLICATIONS

This application is a National Phase Application of PCT International Application No. PCT/IL2019/050140, International Filing Date Feb. 6, 2019, claiming priority of U.S. Patent Application No. 62/626,696, filed Feb. 6, 2018, which is hereby incorporated by reference.

FIELD OF THE INVENTION

The present invention relates to three-dimensional printing. More particularly, the present invention relates to three-dimensional printing on multiple shelves.

BACKGROUND OF THE INVENTION

Three-dimensional printing may refer to any of a broad range of technologies for creating three dimensional objects. In three-dimensional printing, material is "printed" layer by layer on a print bed in a three-dimensional print volume or volume within a printing chamber. Three-dimensional printing is often referred to as "additive manufacturing" since material is added to a growing object (as opposed to subtractive methods such as numerical controlled machining or other machining techniques). Specifications for the printed object are generated as a digital model, e.g., using computer-aided design software.

It is often advantageous to plan a printing session such that the three-dimensional printing chamber is filled with as many printed parts as possible. Depending on the printing technology that is employed, greater throughput may be obtained with less intervention on the part of an operator. For example, the printer may operate throughout a night or another period when operators are not present, such that the printed objects may be ready for removal from the printing chamber in the morning or when the operator returns. In some cases, the printing chamber is heated to an operating temperature prior to printing. Since this heating requires both time and energy, printing many objects during a single printing session, rather than in several sessions, may reduce the time and energy required.

In powder-bed three-dimensional printing technologies, a printed object is built up by depositing successive layers of powder. After a layer of powder is deposited, part of the layer is treated, e.g., by heating or by addition of a binder, to form a cross section of the object to be printed. As successive layers are deposited, successive cross sections of the object are formed. It may be noted that when the powder is a plastic material, multiple objects may be formed, separated from one another by powder that is not formed into the object. However, when the powder is a metallic material or otherwise forms dense objects, the printed objects may sink into the powder such that subsequently deposited layers may be offset from the previously printed sections. Thus, the object may not be printed as planned unless it is supported by a solid base. When additional support is needed, the additional support may interfere with filling the three-dimensional print volume.

In some applications of three-dimensional printing, other considerations may preclude printing of objects above other objects. For example, where an exact form of an upper surface of the object is critical, no additional objects may be printed above that surface in order to avoid possible marring of the surface when printing the additional objects. For example, some producers of dental crowns using metal powder three-dimensional printing technologies may refrain from utilizing the entire three-dimensional print volume since the upper surface of the crown must be precise Similar limitations occur when printing plastic using fused deposition modeling (FDM) technology, and in stereolithographic printing with photopolymers.

SUMMARY OF THE INVENTION

There is thus provided, in accordance with an embodiment, a three-dimensional printing system including: a print bed; a shelf insertion mechanism for inserting a shelf of one or a plurality of auxiliary shelves into a print volume between the print bed and a printer head of the system; a printer assembly that includes the printer head and that is configured to deposit layers of material within the print volume to form one or more objects on a support platform, the support platform including the print bed or a shelf of the one or a plurality of auxiliary shelves that is inserted into the print volume by the shelf insertion mechanism; and a controller that is configured to control the shelf insertion mechanism to insert a shelf of the one or a plurality of auxiliary shelves between the support platform and the printer head after formation of the one or more objects on that support platform by the printer assembly is complete.

Furthermore in accordance with an embodiment, the shelf insertion mechanism is configured to laterally insert the shelf of the one or a plurality of auxiliary shelves into the print volume.

Furthermore in accordance with an embodiment, the print volume is provided with a plurality of rails or brackets for supporting each inserted shelf within the print volume.

Furthermore in accordance with an embodiment, a support structure for supporting the plurality of rails or brackets is configured to enable selection of a distance of each of the rails or brackets from the print bed.

Furthermore in accordance with an embodiment, the shelf insertion mechanism is configured to insert the shelf of the one or a plurality of auxiliary shelves into the print volume via an opening in a print chamber that encloses the print volume.

Furthermore in accordance with an embodiment, the controller is configured to cause the shelf insertion mechanism to insert the shelf of the one or a plurality of auxiliary shelves when the opening is aligned with a plurality of rails or brackets for supporting the inserted shelf within the print volume.

Furthermore in accordance with an embodiment, the shelf insertion mechanism is configured to laterally insert a top shelf of a stack of the plurality of the auxiliary shelves.

Furthermore in accordance with an embodiment, the controller is configured to control the printer assembly to deposit layers of the material within the print volume to form a plurality of shelf support columns on the support platform.

Furthermore in accordance with an embodiment, a height of each shelf support column above the support platform is greater than a height of a tallest object of the one or more objects on that support platform.

Furthermore in accordance with an embodiment, the shelf insertion mechanism is configured to place the shelf of the one or a plurality of auxiliary shelves on top of the plurality of shelf support columns.

Furthermore in accordance with an embodiment, the shelf insertion mechanism includes a robotic arm that is manipulable to remove a shelf from a stack of the plurality of auxiliary shelves and to place the removed shelf on the plurality of shelf support columns.

Furthermore in accordance with an embodiment, the robotic arm is manipulable to remove a top shelf from the stack.

Furthermore in accordance with an embodiment, the controller is configured to move a printing head of the printer assembly prior to placement of the shelf of the one or a plurality of auxiliary shelves on the plurality of shelf support columns.

Furthermore in accordance with an embodiment, the shelf insertion mechanism is configured to laterally insert the shelf of the one or a plurality of auxiliary shelves onto the plurality of shelf support columns.

Furthermore in accordance with an embodiment, the controller is further configured to calculate a distance from the print bed for insertion by the shelf insertion mechanism of each the shelf of the one or a plurality of auxiliary shelves.

There is further provided, in accordance with an embodiment, a method of controlling a three-dimensional printing system, the method including: operating a printer assembly to deposit layers of material within a print volume of the three-dimensional printing system to form one or more objects on a support platform, the support platform including a print bed or a previously inserted auxiliary shelf that was inserted into the print volume; and when formation of the one or more objects on the support platform is complete, operating a shelf insertion mechanism of the three-dimensional printing system to insert an auxiliary shelf of one or a plurality of auxiliary shelves between the support platform and a printer head of the printer assembly and operating the printer assembly to deposit layers of the material to form one or more additional objects on the inserted auxiliary shelf.

Furthermore in accordance with an embodiment, operating the shelf insertion mechanism includes laterally inserting the shelf of one or a plurality of auxiliary shelves onto a plurality of rails or brackets in the print volume.

Furthermore in accordance with an embodiment, the method includes operating the printer assembly to deposit layers of the material within the print volume to form a plurality of shelf support columns on the support platform.

Furthermore in accordance with an embodiment, a height of each shelf support column above the support platform is greater than a height of a tallest object of the one or more objects that was formed on the support platform.

Furthermore in accordance with an embodiment, operating the shelf insertion mechanism includes operating a robotic arm of the shelf insertion mechanism.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a three-dimensional printer system is configured to dynamically add auxiliary shelves above a print bed in a printing chamber. The system is configured to add an auxiliary shelf when objects that are supported by the print bed or any previously inserted auxiliary shelves have been completely formed by the three-dimensional printing process within the printing chamber. For example, the three-dimensional printer system may include a shelf insertion mechanism that is configured to place the auxiliary shelf at a predetermined position within the printing chamber. After insertion of the auxiliary shelf, the three-dimensional printing process may continue to form additional objects that are supported by the auxiliary shelf.

The three-dimensional printer system includes one or more printing heads that selectively form a material into a layer of the object at those parts of the layer that correspond to a cross section of the object. The operation mechanism of the printing head varies according to the type of three-dimensional printing process that is applied by the three-dimensional printer system. For example, the printer head may apply selectively heat, e.g., in the form of one or more laser beams or electron beams, to a layer of a powder or other material that may be fused to form a layer of the object. The remainder of the layer remains in the form of unfused powder that may be removed when printing is complete. In another example, the printing head may selectively extrude a binding material onto the powder to bind the powder at a cross section of the object. In other examples, the printer head may selectively deposit a material to form a layer of the object. Other examples of three-dimensional printer systems use other mechanisms and materials to form the object.

After each layer has been printed, another layer may then be prepared. For example, after each layer is printed, the print bed and auxiliary shelves may be lowered by a distance that is equal to a thickness of the layer. In this manner, the distance between the printer head and the layer being printed is constant. In other examples, the printer head may be raised after each layer is printed. In some cases, other mechanisms may be utilized to enable the printer head to accurately print each layer of the object.

A controller is configured to control or monitor operation of one or more components of the three-dimensional printer system. For example, the controller may control or monitor, or both control and monitor, operation of the printing head and other components of the three-dimensional printer system that are related to printing. The other components may include, for example, a mechanism for lowering the print bed and auxiliary shelves as printing progresses, or a mechanism for raising or controlling the printer head as printing progresses. The controller may control the shelf insertion mechanism to insert an auxiliary shelf into the printing chamber, e.g., when printing of a tallest object has been completed, when the print bed or an auxiliary shelf has been lowered to a predetermined height, when the printer head has been raised to a predetermined height, or under other predetermined conditions.

With some three-dimensional printing technologies, layers may be added to a bottom of an object that is attached to a bottom of a support platform. For example, a printer head below the support platform may selectively illuminate a liquid photo-polymerizing resin at the bottom surface of the object with one or more light beams to cause the resin to polymerize onto the bottom of the object, thus forming an additional layer of the object. After each layer is formed, the support platform raises the object away from the printer head. For convenience and clarity, the discussion describes systems where layers of material are added to the top of an object being printed, and auxiliary shelves are added above completed objects. However, much of the following discussion should be understood as equally applicable to a three-dimensional printer system where layers of material are added to the bottom of objects being printed, mutatis mutandis. In all cases, insertion of an auxiliary shelf above a printed object should be understood as referring to insertion of the auxiliary shelf between the printed object and the printer head.

A three-dimensional printer system with auxiliary shelf capability may enable increasing the filling of the three-dimensional print volume where nesting of objects or otherwise printing objects above other objects is precluded. Each printed object is supported by a rigid support platform, e.g., either the print bed or an auxiliary shelf. Each printed object is thus isolated from any objects that had been previously printed below the support platform. Therefore, each object may be accurately printed without risk of sinking into a layer of loose powder (and thus reducing the accuracy of the printing), marring previously printed objects, and without the need to print an object with support legs that may abut a sensitive surface of another object (that are to be removed from the object after printing).

A mechanism for placement of auxiliary shelves into the printing chamber of three-dimensional printer system may be configured for use with a particular type of three-dimensional printing process, as well as in accordance with operational parameters of the three-dimensional printer system.

In some examples, one or more walls of the printing chamber (e.g., two or more walls) may be provided with an arrangement of brackets or rails that are configured to support an auxiliary shelf at predetermined heights above the print bed. A shelf insertion mechanism may be configured to laterally slide a shelf onto the brackets or rails. The brackets or rails may be configured, e.g., by minimally projecting into the three-dimensional print volume in the printing chamber, to enable maximizing the available space for printing within the printing chamber below the auxiliary shelf.

In some cases, the heights of the brackets or rails, e.g., above the print bed, may be fixed. In some cases, the three-dimensional printer system may enable a user to preselect positions of the brackets or rails prior to the start of the three-dimensional printing process. For example, the walls of the printing chamber may include mounting structure (e.g., holes, slots, or other structure) to which the brackets or rails may be attached. Therefore, the user may have at least minimal control (e.g., limited by fixed positions of the mounting structure) in selecting placement of the brackets or rails.

In some cases, positions of each bracket may be dynamically controllable, e.g., within a range of heights. For example, a motorized positioning mechanism may be controlled by the controller to dynamically change a height of one or more brackets. The motorized positioning mechanism may be similar to, but separately controllable from, a mechanism for changing the height of the print bed. For example, a height of a bracket may be dynamically changed in response to receipt of instructions to print additional objects during operation of the three-dimensional printer system to print previously specified objects.

In some cases, the three-dimensional printer system may be configured to print support columns onto which an auxiliary shelf may be placed. For example, the controller may be configured to automatically calculate the positions and heights of support columns so as to maximize filling of the three-dimensional print volume. Utilizing printed support columns for supporting auxiliary shelves may enable complete control over the heights of the auxiliary shelves. In some cases, however, printing of support columns may entail use of additional printing material, and reduction of the space that is available within the three-dimensional print volume for printing objects.

The controller, after receiving data that describe the objects to be printed, may calculate an optimized printing plan. For example, a criterion for optimization of the printing plan may include optimizing utilization of the three-dimensional print volume. The printing plan may include which of the objects are to be printed on each of the support platforms (print bed and auxiliary shelves). For example, the printing plan may select objects having similar heights for printing on a single support platform. On the basis of the heights of the objects to be printed on each support platform (and on the locations of support structure for supporting auxiliary shelves), the printing plan may determine when the shelf insertion mechanism is to insert or add an auxiliary shelf. In some cases, e.g., where the positions of support brackets or rails are manually adjustable by the user, the controller may issue instructions (e.g., on a display screen or otherwise) that instruct the user to adjust the brackets or rails to the required height.

Depending on the design and intended use of the three-dimensional printer system, the shelf insertion mechanism may be located within or outside of the printing chamber.

For example, the shelf insertion mechanism may be located within the printing chamber, e.g., to the side of the three-dimensional print volume in which objects are printed. The shelf insertion mechanism may include a stack of auxiliary shelves and a mechanism for pushing or otherwise moving the top shelf of the stack onto a bracket, rail, support column, or other support structure within the three-dimensional print volume. For example, the shelf insertion mechanism may move the auxiliary shelf into the three-dimensional print volume when support structure for the auxiliary shelf is vertically aligned with the auxiliary shelf to be moved onto the support structure.

As another example, e.g., when the support structure includes printed columns, the shelf insertion mechanism may be configured to place an auxiliary shelf on the support structure from above. For example, a robot arm may be configured to remove an auxiliary shelf from a stack and place it on the support structure. As another example, a bottom shelf in a stack that is above the three-dimensional print volume may be dropped or lowered onto the support structure. As another example, an auxiliary shelf of a horizontal stack of shelves that is closest to the three-dimensional print volume may be placed onto the support structure after rotation to a horizontal orientation. During the operation of the shelf insertion mechanism to place an auxiliary shelf onto the support structure from above, the printer head may be lifted or laterally moved so as not to interfere with operation of the shelf insertion mechanism.

In another example, the shelf insertion mechanism is located outside of the printing chamber, e.g., adjacent to a wall of the printing chamber. The wall of the printing chamber adjacent to the shelf insertion mechanism may include an insertion slot or other opening through which an auxiliary shelf may be inserted. For example, a pushing mechanism or other mechanism may push a horizontally oriented auxiliary shelf through the insertion slot and onto support structure for supporting the auxiliary shelf. In some cases, the slot or opening may include a cover that remains closed except when an auxiliary shelf is being inserted.

A shelf insertion mechanism that is located outside of the printing chamber may be operated to insert an auxiliary shelf when support structure (e.g., bracket, rail, printed column, or other structure) is aligned with the insertion slot. The support structure may be considered to be aligned with the insertion slot when an auxiliary shelf that is inserted horizontally through the slot will be supported by the support structure. For example, the support structure may be considered to be aligned with the insertion slot when the top of the support structure is coplanar with (or a predetermined distance below, a bottom of the insertion slot or of an auxiliary shelf that is inserted through the insertion slot.

Figure 1:
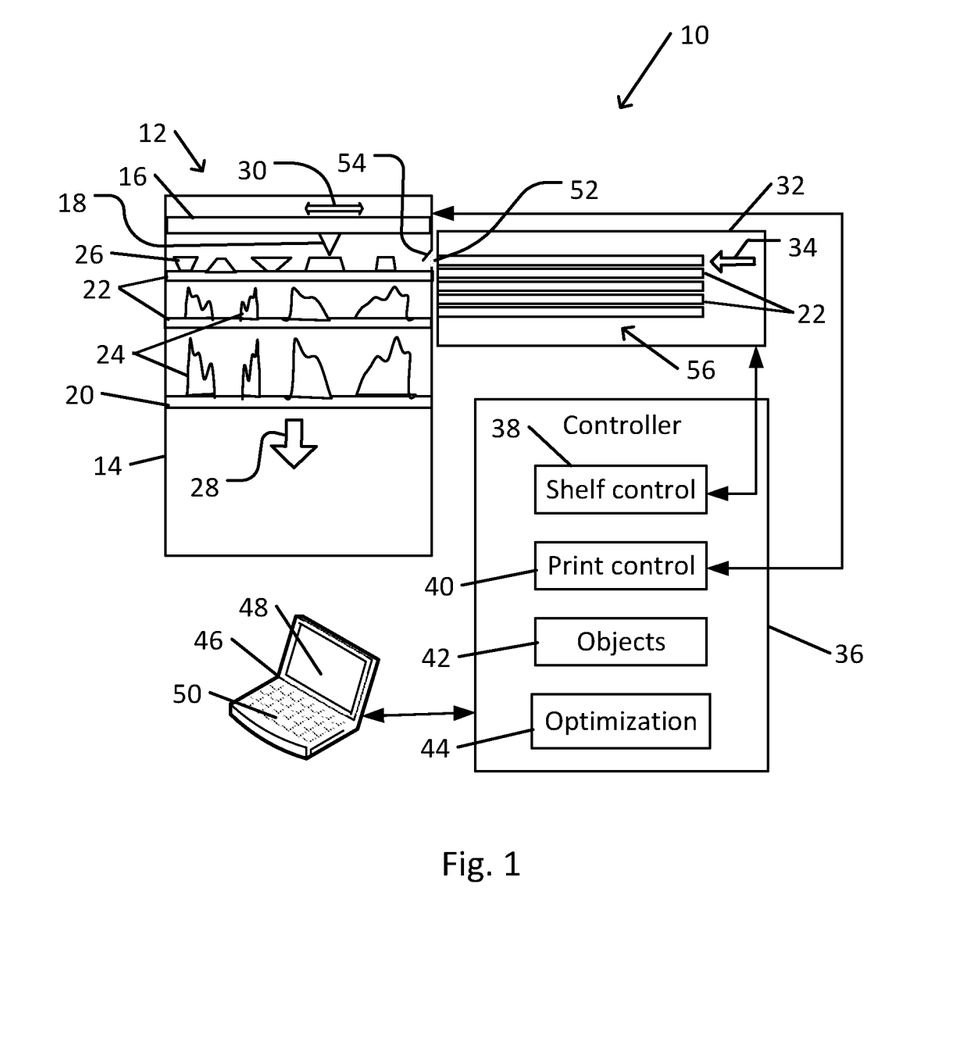
FIG. 1 schematically illustrates an example of a three-dimensional printer system with auxiliary shelves.

FIG. 1 schematically illustrates an example of a three-dimensional printer system with auxiliary shelves.

Three-dimensional printing system 10 is configured to print a plurality of printed objects 24 on a plurality of support platforms. The support platforms include print bed 20 and one or more auxiliary shelves 22.

Printing assembly 12 of three-dimensional printing system 10 is controllable by print control module 40 of controller 36 to print a plurality of printed objects 24. For example, instructions describing printed objects 24 may be entered by a user via user interface device 46. For example, user interface device 46 may include one or more computers, smartphones, consoles, or other devices that include one or more input devices 50 and one or more output devices 48. A user may operate input device 50 to enter definitions of a program for defining objects (e.g., a computer aided design program) to enter one or more object definitions 42. For example, object definitions 42 may be stored in a memory or other data storage unit of controller 36, or that is in communication with controller 36.

Prior to controlling printing assembly 21, optimization module 44 of controller 36 may calculate an optimum order of printing and position of each printed object 24 on print bed 20 or on an auxiliary shelf 22. Alternatively or in addition, a user may decide on an order of printing and on where auxiliary shelves 22 are to be inserted above print bed 20.

Printing assembly 12 includes head assembly 16 that operates within printing chamber 14, which may define and enclose a print volume within which printed objects 24 may be formed. Head assembly 16 is configured to laterally move printer head 18 with scanning motion 30 (to be understood as representing two-dimensional motion in a plane) in a plane above partially printed objects 26. When printer head 18 is positioned above one of partially printed objects 26, printer head 18 may be operated by print control module 40 of controller 36 to add material to that partially printed object 26. For example, printer head 18 may be configured to deposit material onto partially printed object 26 (and to expose the deposited material to curing radiation or process). As another example, a powder distribution assembly (not shown) may distribute a layer of powder within printing chamber 14 above the highest support platform (e.g., print bed 20, or an auxiliary shelf 22 as in the example shown). In this example, printer head 18 may be controlled to apply heat (e.g., laser or electron beam) or a binding substance to the layer of powder above partially printed objects 26 in order to bind that layer of powder to each of partially printed objects 26. Printer head 18 may be configured to apply other three-dimensional printing techniques to the tops of partially printed objects 26.

In the example shown, as each layer of material is added to partially printed objects 26 by printer head 18, the support platform that supports partially printed objects 26, e.g., auxiliary shelf 22, in the example shown, is lowered to enable formation of another layer between the tops of partially printed objects 26 and printer head 18. In other examples, printer head 18 may be raised or may otherwise be adjusted in order to add the new layer to partially printed objects 26.

When printing of all printed objects 24 that are supported by a single support platform is complete, another auxiliary shelf 22 may be added to printing chamber 14 by shelf insertion mechanism 32. Shelf insertion mechanism 32 may be controlled by shelf control module 38 of controller 36 to insert a new auxiliary shelf 22.

In the example shown, auxiliary shelves 22 are stored within shelf insertion mechanism 32 in the form of shelf stack 56. Operation of shelf insertion mechanism 32 causes a lateral force 34 to be applied to one of auxiliary shelves 22 in shelf stack 56 to push or otherwise impel that auxiliary shelf 22 (the top auxiliary shelf 22 in shelf stack 56, in the example shown) into printing chamber 14. In the example shown, auxiliary shelf 22 is impelled into printing chamber 14 via shelf opening 52. When no auxiliary shelf 22 is being impelled into printing chamber 14, cover 54 may close shelf opening 52 (e.g., to retain heat inside of printing chamber 14, to prevent powder or other material from escaping printing chamber 14, to prevent contaminants from entering printing chamber 14, or otherwise).

In the example shown, shelf insertion mechanism 32 is shown as outside of printing chamber 14. In other examples, shelf insertion mechanism 32 may be located within printing chamber 14.

Figure 2:
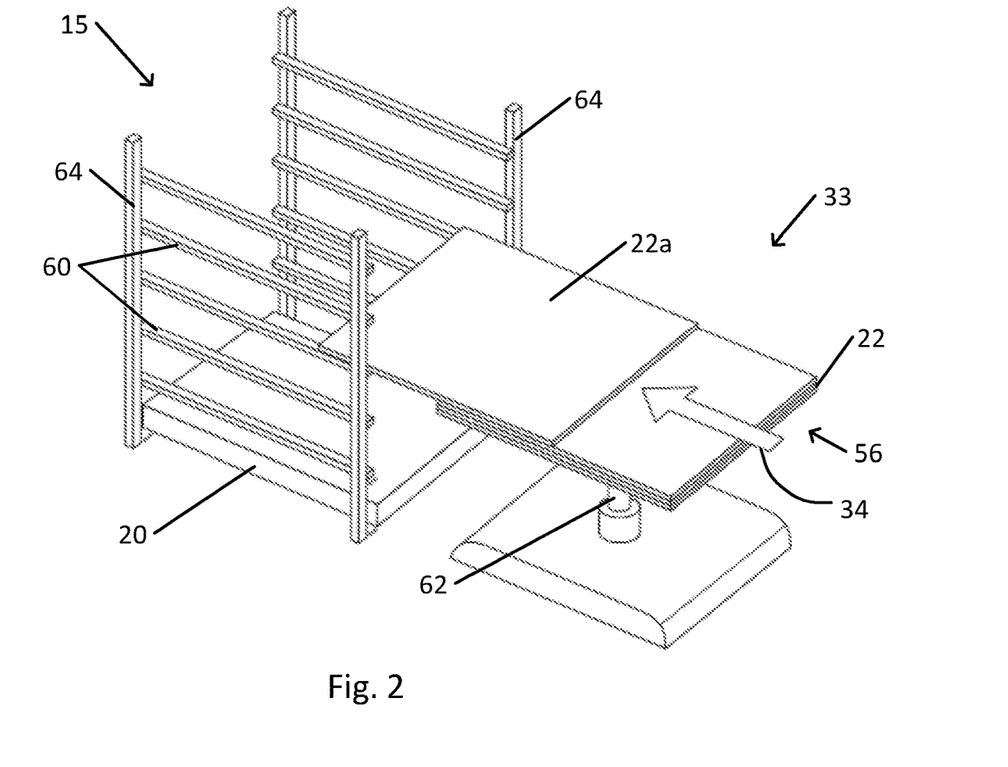
FIG. 2 schematically illustrates an example of a shelf insertion mechanism of an example of the system shown in FIG. 1, where the print volume is provided with shelf support rails.

FIG. 2 schematically illustrates an example of a shelf insertion mechanism of an example of the system shown in FIG. 1, where the print volume is provided with shelf support rails.

In the example shown, print volume 15 is provided with a plurality of shelf support rails 60. Shelf support rails 60 are mounted on rail support structure 64 above print bed 20. For example, rail support structure 64 may be configured to be raised (e.g., in preparation for printing) or lowered (e.g., during printing, e.g., after addition of a layer to partially printed objects 26) together with print bed 20.

In some examples, shelf support rails 60 are fixed to rail support structure 64, e.g., by a manufacturer of print volume 15. In other examples, shelf support rails 60 may include structure (e.g., slots, projections, or other mounting structure) that enables a user to change a position of a shelf support rail 60, add a shelf support rail 60, or remove a shelf support rail 60 (e.g., between two previously mounted shelf support rails 60, or between a shelf support rail 60 and print bed 20). For example, the user may adjust the positions of shelf support rails 60 on rail support structure 64 in accordance with specific objects that are to be printed. In other examples, some or all of shelf support rails 60 may be dynamically adjustable, e.g., by a motor that is controlled by controller 36.

In some examples, shelf support rails 60 may be replaced by brackets that do not extend across the entire width of print volume 15.

In some examples, shelf support rails 60, rail support structure 64, or other parts of print volume 15 may include retaining structure that prevents an inserted auxiliary shelf 22 from sliding within print volume 15, e.g., along shelf support rails 60. For example, the locking structure may include walls of print volume 15, or one or more extendible pins, latches, or other structure that may engage an inserted auxiliary shelf 22 to prevent sliding or other motion of that auxiliary shelf 22.

In the example shown, shelf insertion mechanism 33 is configured to insert a top shelf 22a of a shelf stack 56 of auxiliary shelves 22 onto a pair of shelf support rails 60. For example, shelf insertion mechanism 33 may include an extendable projection that is configured to push against an edge of top shelf 22a, to a apply a friction force to a top surface of top shelf 22a, or to otherwise apply lateral force 34 to top shelf 22a. Application of lateral force 34 to top shelf 22a may push top shelf 22a onto a pair of shelf support rails 60 (or onto a set of three or more support brackets).

Shelf insertion mechanism 33 may be configured such that when lateral force 34 is applied, only top shelf 22a is moved while the other auxiliary shelves 22 of shelf stack 56 remain on shelf stack 56. For example, retaining structure of shelf insertion mechanism 33 may retain the other auxiliary shelves 22 within shelf stack 56. When shelf insertion mechanism 33 is located outside of a wall of print volume 15, e.g., where top shelf 22a is inserted into print volume 15 via a shelf opening 52, the dimensions of shelf opening 52 may be designed to enable insertion of only top shelf 22a. In other examples, adjacent auxiliary shelves 22 in shelf stack 56 may be isolated from one another by a low friction bearing or surface. Therefore, a lateral force 34 that is applied to top shelf 22a may not be transmitted to another auxiliary shelf 22 of shelf stack 56.

In the example shown, shelf stack 56 is supported by stack support column 62. For example, a height of stack support column 62 may be adjustable to align top shelf 22a with one or more of a particular pair of shelf support rails 60, shelf opening 52, or other structure of print volume 15. For example, where top shelf 22a is inserted via shelf opening 52, the height of stack support column 62 may be adjustable such that top shelf 22a is always aligned with shelf opening 52 as auxiliary shelves 22 are removed from shelf stack 56.

In a system where the heights of print bed 20 and shelf support rails 60 do not change during printing, but rather the height of head assembly 16 is raised during printing, stack support column 62 may be adjustable to insert top shelf 22a onto shelf support rails 60 at a predetermined distance from printer head 18.

In some cases, shelf stack 56, as well as stack support column 62 and a mechanism for applying lateral force 34, may be enclosed within a printing chamber that encloses print volume 15 (e.g., in a three-dimensional printing system 10 that does not utilize powder bed printing).

Although insertion of top shelf 22a is described, other configurations of shelf stack 56 are possible. For example, when the shelf stack is arranged such that the auxiliary shelves 22 stand on end, the shelf that is nearest to print volume 15 may be inserted (e.g., after being rotated to a horizontal configuration). In other cases, a shelf stack 56 may be suspended from above, such that the insertion mechanism may be configured to insert a bottom auxiliary shelf 22 of the stack. Other configurations are possible.

In may be noted that in the example shown, and depending on the configuration of printing head 18 (and on any shelf support rails 60 that are located above an inserted top shelf 22a), the full surface area of top shelf 22a after insertion into print volume 15 may be available for printing of printed objects 24. However, the vertical space available for printing of printed objects between adjacent support surfaces (print bed 20 and inserted auxiliary shelves 22) may be limited to discrete values that are determined by the vertical placement of shelf support rails 60.

Figure 3:
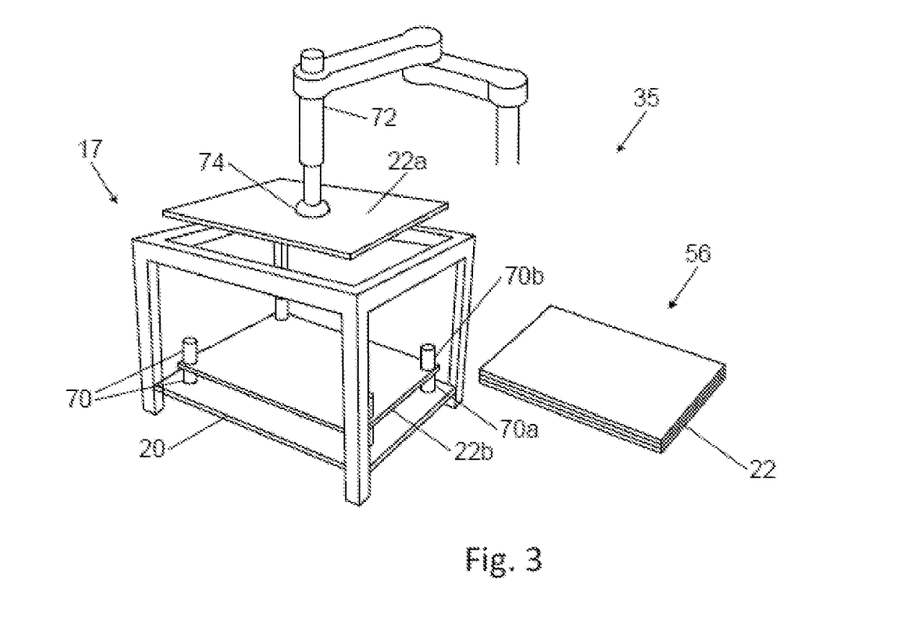
FIG. 3 schematically illustrates an example of a shelf insertion mechanism of an example of the system shown in FIG. 1, where the auxiliary shelves are supported by printed columns.

FIG. 3 schematically illustrates an example of a shelf insertion mechanism of an example of the system shown in FIG. 1, where the auxiliary shelves are supported by printed columns.

In the example shown, print volume 17 is not provided with any shelf support structure (e.g., rails or brackets). Any auxiliary shelves 22 that are inserted above print bed 20, such as inserted auxiliary shelf 22b in the example shown, are supported by a plurality of printed shelf support columns 70 that are located at the periphery of inserted auxiliary shelf 22b. For example, each inserted auxiliary shelf 22b may be supported by four printed shelf support columns 70 located at corners of rectangular auxiliary shelves 22. In some cases, e.g., depending on the lateral distribution and the weights of printed objects 24, more than four of fewer than four (e.g., at least three) printed shelf support columns 70 may be provided.

When printing printed objects 24, printer head 18 may be operated to print the plurality of printed shelf support columns 70 on the support platform on which printed objects 24 are being printed. In the example shown, printed shelf support columns 70*a* were printed on print bed 20 and printed shelf support columns 70*b* were printed on inserted auxiliary shelf 22*b*.

The heights of printed shelf support columns 70 that are printed on each support platform are typically taller than the tallest printed object 24 that was printed on that support platform. A minimum difference in height between a printed shelf support column 70, and thus, of a bottom of an auxiliary shelf 22 that is placed on printed shelf support columns 70, and the tallest printed object 24, may be determined on the basis of one or more considerations. For example, the minimum height difference may be selected so as to ensure that placement of an auxiliary shelf 22 on printed shelf support columns 70 and printing on that placed auxiliary shelf 22 do not risk damaging the upper surfaces of printed objects 24.

In some cases, an auxiliary shelf 22 may be inserted into print volume 17 laterally, as by shelf insertion mechanism 33 shown in FIG. 2. For example, an auxiliary shelf 22 may be inserted laterally in a manner that ensures that a leading edge of the inserted auxiliary shelf 22 passes above the tops of printed shelf support columns 70 without colliding with their sides. For example, auxiliary shelf 22 may be inserted at an upwardly sloping angle such that even in the presence of any cantilevered bending of the inserted auxiliary shelf 22, the leading edge passes over printed shelf support columns 70.

In the example shown, shelf insertion mechanism 35 is configured to lower a top shelf 22*a* that is removed from shelf stack 56 onto printed shelf support columns 70 from above. In the example shown, robotic arm 72 is manipulable so as to lift top shelf 22*a* from shelf stack 56. For example, a distal end of robotic arm 72 may be provided with shelf grabber 74 that is configured to lift top shelf 22*a* off of shelf stack 56. For example, shelf grabber 74 may include a suction mechanism or other mechanism (e.g., robotic fingers, adhesive surface, or other mechanism) that is capable of exerting sufficient force on top shelf 22*a* so as to enable robotic arm 72 to lift top shelf 22*a* off of shelf stack 56, and to hold top shelf 22*a* as top shelf 22*a* is manipulated to a position above printed shelf support columns 70.

When top shelf 22*a* is positioned above printed shelf support columns 70 (as in the example shown), robotic arm 72 may be manipulated to lower top shelf 22*a* onto printed shelf support columns 70. After top shelf 22*a* is lowered onto printed shelf support columns 70 such that top shelf 22*a* is resting on printed shelf support columns 70, shelf grabber 74 may be operated to release top shelf 22*a*. Robotic arm 72 may then be manipulated such that shelf grabber 74 is returned to the position of shelf stack 56.

When robotic arm 72 is in operation to bring top shelf 22*a* to printed shelf support columns 70, head assembly 16 may be raised or otherwise moved so as not to interfere with operation of robotic arm 72.

It may be noted that when printed shelf support columns 70 are used to support auxiliary shelves 22, a large amount of flexibility is available in vertical placement of auxiliary shelves 22. Thus, the vertical space available in print volume 17 may be efficiently utilized. However, depending on the sizes and number of printed shelf support columns 70, the lateral space that is available for printing on print bed 20 and on auxiliary shelves 22 may be limited.

Controller 36 of three-dimensional printing system 10 may be configured to execute a method for three-dimensional printing with insertion of auxiliary shelves.

Figure 4:
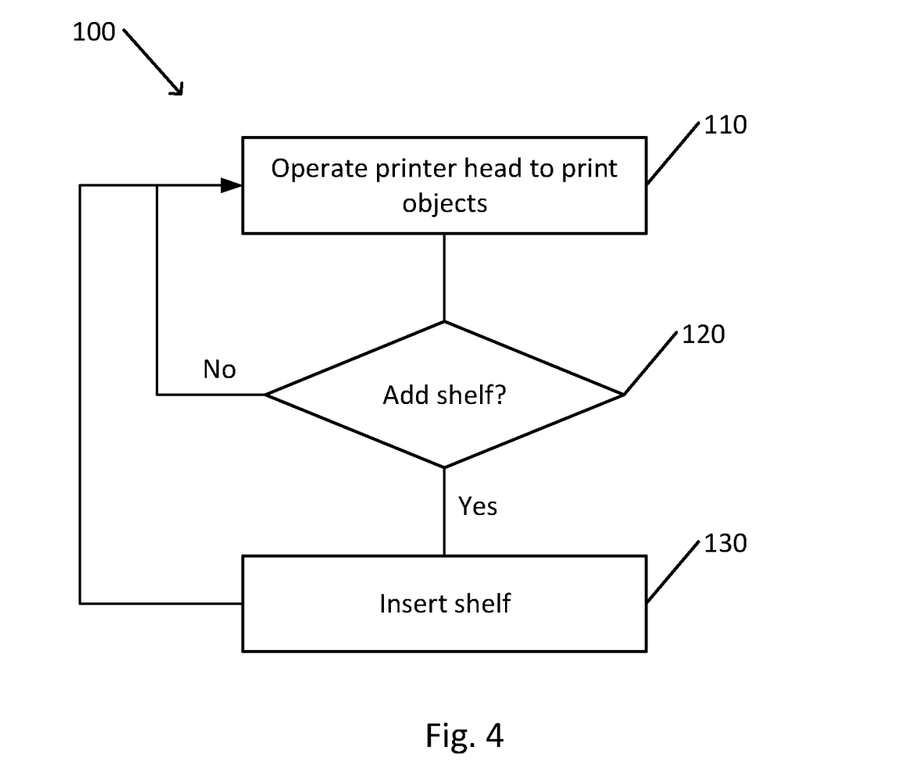
FIG. 4 is a flowchart depicting an example of a method for three-dimensional printing with insertion of auxiliary shelves.

FIG. 4 is a flowchart depicting an example of a method for three-dimensional printing with insertion of auxiliary shelves.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Three-dimensional printing method 100 may be executed by a controller 36 (e.g., a processor of controller 36 that operates in accordance with programmed instructions and parameters) of three-dimensional printing system 10. For example, three-dimensional printing method 100 may be executed during printing of one or more printed objects 24 by three-dimensional printing system 10.

During printed, head assembly 16 and printer head 18 may be operated to add layers of material to one or more partially printed objects 26 so as to form printed objects 24 (block 110). The layers of material are added above a support platform such as print bed 20 or an auxiliary shelf 22.

For example, one or more printing processes may be applied to add the layers of material. The methods may include selective extrusion and deposition (and curing) of material, selective fusing of a layer of powder, selective deposition of a binding material on a layer of powder, or another three-dimensional printing technique known in the art.

As each layer of material is added to partially printed objects 26, the support platform may be lowered to maintain a constant distance between printer head 18 and partially printed objects 26. Alternatively or in addition, printer head 18 may be raised, or one or more properties of printer head 18 may be adjusted (e.g., location of a focus or waist of laser beam or electron beam) in order to maintain the constant distance or otherwise enable accurate printing.

As long as insertion of an auxiliary shelf 22 is not indicated (block 120), printing continues (block 110). In some examples, adding layers of material to partially printed objects 26 includes adding layers of material to a plurality of printed shelf support columns 70.

When printing of all printed objects 24 on a support platform is complete, addition of an auxiliary shelf 22 may be indicated (block 120).

When addition of an auxiliary shelf 22 is indicated, shelf insertion mechanism 32 may be operated to insert an auxiliary shelf 22 (block 130). For example, an auxiliary shelf 22 may be inserted to rest on shelf support rails 60 or on printed shelf support columns 70. Shelf insertion mechanism 32 may be configured to laterally insert an auxiliary shelf 22 (e.g., as by shelf insertion mechanism 33), or may be configured to insert an auxiliary shelf 22 from above (e.g., as by shelf insertion mechanism 35).

After addition of the auxiliary shelf 22, printer head 18 may continue to be operated to print additional printed objects 24 on the added auxiliary shelf 22.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A three-dimensional printing system comprising:
   a print volume;
   a printer head;
   a print bed;
   one or more auxiliary shelves;
   a shelf insertion mechanism for inserting the one or more auxiliary shelves into the print volume and between the print bed and the printer head;
   a printer assembly that includes the printer head and that is configured to deposit layers of material within the print volume to form one or more objects on the print bed and the one or more auxiliary shelves inserted into the print volume by the shelf insertion mechanism; and
   a controller that is configured to control the shelf insertion mechanism to insert a shelf of said one or more auxiliary shelves between the print bed and the printer head after formation of an object of said one or more objects on the print bed by the printer assembly is complete,
   wherein the controller is further configured to control the printer assembly to deposit layers of the material within the print volume to form a plurality of shelf support columns on the print bed, and
   wherein the shelf insertion mechanism is configured to insert the shelf of said one or more auxiliary shelves by lowering the shelf of said one or a plurality of auxiliary shelves on top of the plurality of shelf support columns.

2. The system of claim 1, further comprising an additional shelf insertion mechanism configured to laterally insert an additional auxiliary shelf into the print volume.

3. The system of claim 2, wherein the lateral insertion is performed at an upwardly sloping angle.

4. The system of claim 1, wherein the one or more auxiliary shelves comprises a plurality of auxiliary shelves stacked vertically, and wherein the shelf insertion mechanism is configured to insert a top shelf of the stack of auxiliary shelves into the print volume.

5. The system of claim 1, wherein a height of each of the shelf support columns is greater than a height of a tallest object of said one or more objects formed on the print bed.

6. The system of claim 1, wherein the one or more auxiliary shelves comprises a plurality of auxiliary shelves stacked vertically, and wherein the shelf insertion mechanism comprises a robotic arm that is manipulable to remove a shelf from the stack of auxiliary shelves and to place the removed shelf on said plurality of shelf support columns.

7. The system of claim 6, wherein the robotic arm is manipulable to remove a top one of the shelves from the stack.

8. The system of claim 1, wherein the controller is configured to move the printer head of the printer assembly prior to said lowering of said shelf on top of the plurality of shelf support columns.

9. The system of claim 1, wherein the controller is further configured to calculate a distance from the print bed for insertion by the shelf insertion mechanism of each of said one or more auxiliary shelves.

10. The system of claim 1, wherein said one or more objects comprises a plurality of objects, wherein the one or more auxiliary shelves comprises a plurality of auxiliary shelves, and wherein the controller is further configured to:
    control the printer assembly to deposit layers of the material within the print volume to form, on the shelf lowered on top of the shelf support columns, an additional object of said plurality of objects and additional shelf support columns; and
    control the shelf insertion mechanism to insert an additional shelf of said plurality of auxiliary shelves on top of the additional shelf support columns.

* * * * *

UNITED STATES PATENT AND TRADEMARK OFFICE
CERTIFICATE OF CORRECTION

| | | |
|---|---|---|
| PATENT NO. | : 11,554,543 B2 | Page 1 of 1 |
| APPLICATION NO. | : 16/965725 | |
| DATED | : January 17, 2023 | |
| INVENTOR(S) | : Dan Halperin et al. | |

It is certified that error appears in the above-identified patent and that said Letters Patent is hereby corrected as shown below:

On the Title Page

Item (60), should read:
--Related U.S. Application Data:
(60) Provisional application No. 62/626,696, filed on Feb. 6, 2018--

Signed and Sealed this
Third Day of September, 2024

Katherine Kelly Vidal
*Director of the United States Patent and Trademark Office*